Figure 1:
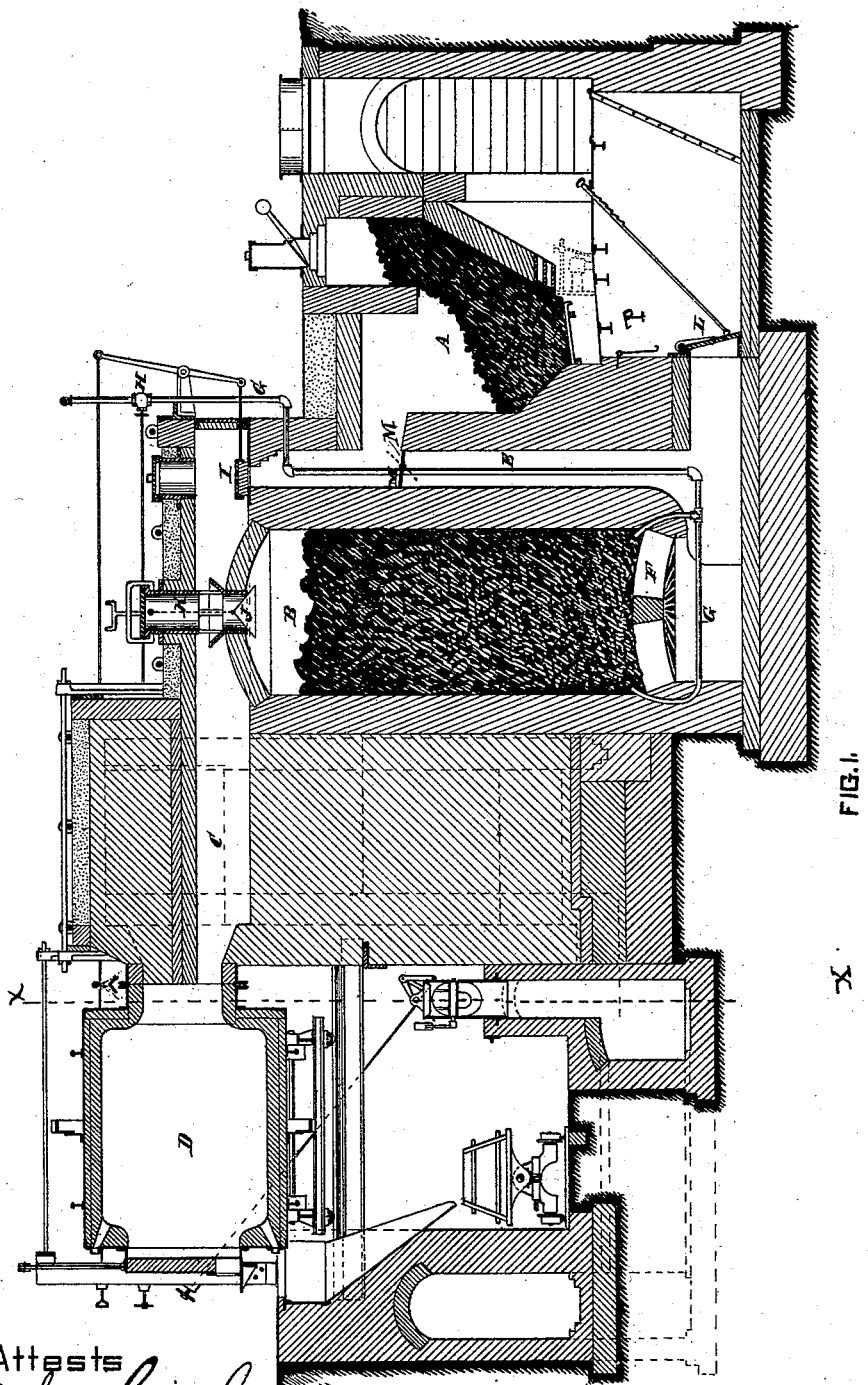

(No Model.) 2 Sheets—Sheet 1.

R. M. HUNTER.
PROCESS OF AND APPARATUS FOR THE MANUFACTURE OF IRON OR STEEL.

No. 528,943. Patented Nov. 13, 1894.

Attests
R Schielf
Gordon Teckel

Inventor
R. M. Hunter

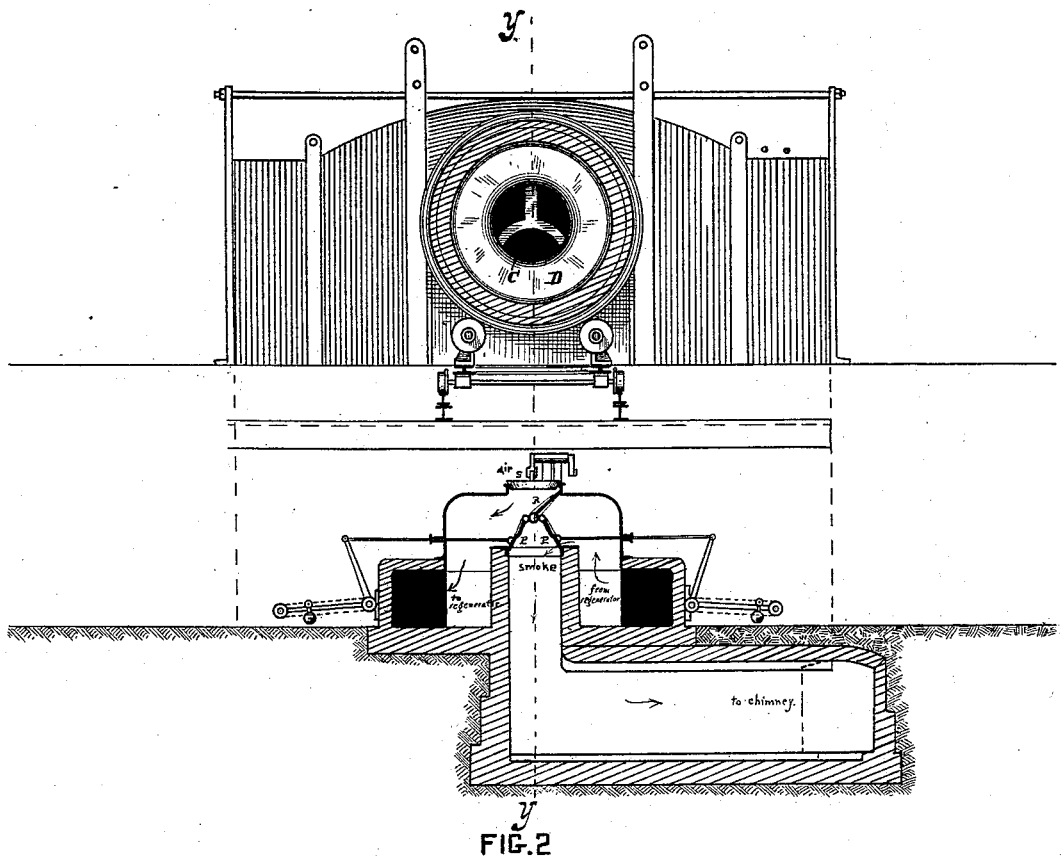

UNITED STATES PATENT OFFICE.

RUDOLPH M. HUNTER, OF PHILADELPHIA, PENNSYLVANIA.

PROCESS OF AND APPARATUS FOR THE MANUFACTURE OF IRON OR STEEL.

SPECIFICATION forming part of Letters Patent No. 528,943, dated November 13, 1894.

Application filed September 16, 1879.

*To all whom it may concern:*

Be it known that I, RUDOLPH M. HUNTER, of Philadelphia, county of Philadelphia, and State of Pennsylvania, have invented an Improved Process of and Apparatus for the Manufacture of Iron or Steel, of which the following is a specification.

My invention has reference to metallurgical processes in general, but more particularly to processes by which iron ore is directly reduced to the metallic state; and consists in certain improvements in the process therefor, and in apparatus for carrying the same in operation, all of which is fully set forth in the following specification and shown in the accompanying drawings which form part thereof.

In carrying out my process it is essential to burn the carbonic oxide and hydrogen under pressure in the furnace and also to admit these gases in a certain order. The ore to be treated after being heated is subjected to hydrogen and carbonic oxide under the pressure, and one of the most important features of my process consists in bringing these gases into such a relation with the oxide of iron that the following results take place, viz:— the carbonic oxide combines with oxygen of the oxide of iron and forms carbonic acid and this is then decomposed by the hydrogen with which it is brought into intimate contact forming steam and "nascent" carbonic oxide which compound is produced in the presence of the oxide of iron, and in which nascent condition it has a far greater affinity for oxygen than when brought in from the producer. Part of the hydrogen also combines with some of the oxygen of the ore to form steam and also tends to reduce said ore.

Hydrogen when burned under the atmospheric pressure gives but about 5° higher temperature than the carbonic oxide, but when compressed so as to weigh as much as the carbonic oxide it has many times the heating power, its intensity of combustion becoming enormous.

Weight for weight hydrogen has about thirty times the reducing power of carbonic oxide at a white heat. The intense heat generated by the burning hydrogen under pressure facilitates the whole operation and reduces the quantity of flux necessary; and also extracts the phosphorus and sulphur to some extent from the ore, to form phosphureted and sulphureted hydrogen which pass off with the escaping gases.

Toward the end of the operation the hydrogen is admitted more freely, which raises the temperature to facilitate balling, and as it contains no oxygen, it cannot burn or oxidize the iron, but on the contrary would tend to reduce any oxide of iron formed by the action of carbonic acid or air upon the metallic iron, thus saving great loss from oxidation which now takes place. During the progress of the operation carbonic oxide can be admitted by itself or in combination with the usual constituents of producer gas, and when desired the hydrogen and carbonic oxide can be admitted together and in the proportions required.

In producing hydrogen gas I can generate carbonic oxide at the same time, and hence conveniently mix the two during their generation, and prior to their admission to the furnace.

My improved process is applicable to any metallurgical operation for producing iron or steel where natural or artificial oxide of iron is to be reduced, or where high temperature is required with a reducing action, but is more particularly related to the production of iron and steel direct from the ores, where natural oxides of iron are to be reduced.

The apparatus for producing the gases is shown in the accompanying drawings and its construction and mode of operation will be subsequently explained.

I may generate hydrogen also in the manner described in a patent granted to me, dated June 17, 1879, and such hydrogen may be used in conjunction with the carbonic oxide gas generated in a producer by a forced blast of air in place of the producer for mixed carbonic oxide and hydrogen set out in this application.

The main reaction upon which I base my present process is, that the carbonic oxide after partly reducing the ore and being converted into carbonic acid, is decomposed by the hydrogen, setting free "nascent" carbonic oxide which attacks the oxide of iron with far greater reducing power; and also in combination with this reaction, the reducing and cleansing power of hydrogen, which when burned under a pressure sufficient to make its weight equal to carbonic oxide under the ordinary pressure at a white heat gives thirty times the reducing power.

It is understood that the amount of pressure under which the reducing gases are to be burned may be varied at will, but the higher the better.

In the drawings:—Figure 1. is a sectional elevation on line $y\ y$ of a furnace embodying in it my improvements, and whereby my process may be operated, and Fig. 2 is a cross section of same on line $x\ x$.

A is the ordinary Siemens producer. There are usually three or four of these producers to one furnace.

B is my generator in which I generate hydrogen gas.

C is a flue always maintained at a high heat by the escaping gases which pass to the regenerators, and which flue heats the gas passing from the producer A and generator chamber B to the rotator or furnace D which contains the oxide of iron, fluxes and other necessary ingredients.

E is a flue from the producers A to the bottom of the generator chamber B and is furnished with a suitable valve M.

F is an arched bottom or grate to the chamber B upon which the carbonaceous material rests.

G is a steam pipe, and is supplied with a valve H whereby steam can be turned on or shut off at will.

I is a valve which regulates the admission of carbonic oxide into the flue C and thence to the rotator or furnace.

J is a valve which regulates the supply of hydrogen gas to the flue C and furnace D.

K is a passage through which the fuel is thrown into the chamber B.

L is a door which admits air.

In place of door L an air blast pipe may be used, and the draft kept up under pressure.

The smoke or gas outlet is provided with valves P, P and R, the former of which are to regulate the pressure under which the gases from the furnace are allowed to escape to the chimney, and hence control the pressure under which it is burned also, and the latter of said valves is used to control the supply of air to the regenerator desired before passing into the furnace. The pressure may be regulated by the weighted levers which keep said doors or levers shut.

Any suitable device or devices for controlling the pressure may be used if desired in place of those shown.

The operation is as follows:—The rotator D being charged, and the producer A in action, and also combustion set up in chamber B, all or none of the oxide generated in A is caused to pass through flue E to the bottom of the chamber B where air is admitted to bring the carbon in said chamber to a state of incandescence. The product of combustion at and near the grate F is carbonic acid, but is afterward converted into carbonic oxide as it passes up through the mass of coal, and passing through valve I into heated flue C it at last enters the rotator, where it is fully burned at first, and then partly burned so as to maintain a reducing flame. When the ore begins to be reduced and is in a highly heated state, the air from L is shut off and the valve M in flue E is closed. The carbon in chamber B is then in a state of incandescence, and I now turn on a small quantity of steam by valve H which is conducted by pipe G to the bottom of the bed of incandescent carbon, where it is instantly decomposed forming free hydrogen and carbonic oxide. By this means I get hydrogen and carbonic oxide mixed and which gases pass through valve J and heating flue C becoming superheated, and then enter the rotator D where the carbonic oxide has been converted into carbonic acid and the ore partly reduced; the carbonic acid formed being reduced in its turn by the hydrogen, forming steam, and "nascent" carbonic oxide which latter attacks the oxide of iron with far greater vigor than it originally did. The hydrogen also acts the part of a reducing agent and also frees the contents of the rotator of sulphur and phosphorus which form phosphureted and sulphureted hydrogen gases which pass off. As the hydrogen is first generated some carbonic oxide is mixed with it from the producer A which passing through the valve I, mixes with the hydrogen in the flue C. As the process draws near completion and the ore is nearly reduced, the carbonic oxide is shut off from the producer A and a greater supply of steam under high pressure is forced into the bed of incandescent coal in chamber B which gives an increased supply of hydrogen, and at the same time by the aid of the properly constructed dampers or valves P R S it is burned under great pressure in the rotator D, which consequently increases its calorific intensity, which is particularly valuable at this juncture of the operation.

The materials being treated by my process are agitated as the iron or steel is coming to nature toward the completion of the process or when balling.

Supposing there to be three producers A to a furnace almost the same effect would be produced by closing up the base of two or more, and introducing steam and blast pipes as shown in dotted lines, and doing away with the chamber B, yet this change would not alter my process.

In practice I have found that ore was reduced in about one half the time with my process, that is required in the ordinary way. I also found that changes in temperature of the furnace were more easily and perfectly regulated.

The hydrogen may be burned at all times under pressure in the furnace or only toward the completion of the process, its pressure being easily regulated by the admission of steam, which may be forced into the chamber B under any desired pressure, and by the use of suitable valves controlling the escape of the products of combustion from the furnace. If the production of hydrogen is kept up and the outlets heavily loaded the combustion must take effect under high pressure, and of course where this is very great the heated air for the combustion should be forced in by positive means as a blowing engine.

It is not necessary that the chamber B be built in with the furnace but I prefer to construct it so, for the reason that heat from the regenerators and producers tend to keep the hydrogen and carbonic oxide generators hot saving coal and time, and also allow of the more ready admixture of carbonic oxide with the hydrogen.

The hydrogen generator might be constructed within a sheet iron shell with a suitable charging apparatus and gas exit at top and a blast pipe and steam pipe at bottom. The gas exit would be connected with the furnace. In this case the carbonaceous bed would be brought to incandescence by the action of air blast upon the carbon instead of air upon carbonic oxide, but the product would be precisely the same, and in this case it could be attached to any furnace now built.

Although I have set forth the "direct process" in this specification yet the process is applicable to any metallurgical operation in which a high and regulated temperature is required, and where any natural or produced oxide is to be reduced.

The decomposition of steam by incandescent carbon is old, but the combination of the process with a furnace in which the products of the decomposed steam are burned under pressure in the presence of oxides of iron producing the reactions as set forth is new, and opens a new field to the "direct process."

The great value of my process lies in the fact of the production of the "nascent" carbonic oxide, and burning the hydrogen under pressure, and as far as I am aware these two points have never been directly or indirectly touched on before by any metallurgists.

Having now described my invention, what I claim as new, and desire to secure by Letters Patent, is—

1. The herein described process for the manufacture of iron and steel, consisting in passing hydrogen gas under pressure considerably above the normal into carbonic acid in the presence of oxide of iron in a state of agitation and inclosed in a furnace or vessel practically air tight, the said hydrogen decomposing the said carbonic acid into oxygen and "nascent" carbonic oxide, and bringing the nascent carbonic oxide into direct contact with the oxide of iron which it readily reduces.

2. The process for manufacturing iron and steel, consisting in first passing carbonic oxide without hydrogen into a reducing furnace practically air tight and containing oxide of iron kept in a state of agitation to expose fresh surfaces, and then partly burning it to carbonic acid by the oxygen contained in the ore, and secondly in passing hydrogen into the carbonic acid in contact with the oxide of iron for the purpose of decomposing it and setting "nascent" carbonic oxide free which then attacks the partly reduced oxide of iron with great vigor readily combining with its last trace of oxygen.

3. A metallurgical furnace made practically air tight and provided with an inlet and an outlet, the latter being provided with dampers by which the escape of the reducing gases is retarded or prevented and by which they are caused to be burned under pressure in said furnace in combination with a hydrogen gas generator for producing hydrogen under pressure, and a connecting flue to conduct hydrogen into the furnace.

4. The herein described process for manufacturing iron and steel, consisting in first passing air into a bed of burning carbon, then passing the carbonic oxide produced into the bottom of a second bed of carbon, and then burning said carbonic oxide to carbonic acid by air, then passing the carbonic acid produced up through the secondary bed of carbon, reducing the gas again to carbonic oxide, then passing such carbonic oxide into a metallurgical furnace containing an oxide of iron, which gives up part of its oxygen, and secondly, in passing steam into the incandescent secondary bed of carbon, and passing the hydrogen mixed with the carbonic oxide so produced into the metallurgical furnace containing carbonic acid gas in the presence of the oxide of iron, which it decomposes forming steam and "nascent" carbonic oxide in the presence of the oxide of iron.

5. The process for manufacturing iron and steel, which consists in generating carbonic oxide and hydrogen in the separate generators or producers, then passing the carbonic oxide into the metallurgical furnace containing an oxide of iron, and after heating said oxide of iron and partly reducing the same, in passing hydrogen previously mixed with some carbonic oxide into the furnace in the presence of the partly reduced oxide of iron, and toward the completion of the deoxidation process increasing the proportion of the hydrogen, the said steps being taken in the order named.

6. The process for manufacturing iron and steel, which consists in generating carbonic oxide and hydrogen in separate generators, then passing the carbonic oxide into the metallurgical furnace containing an oxide of iron, and after heating said oxide of iron and partly reducing the same passing hydrogen previously mixed with some carbonic oxide (but the carbonic oxide being greatly in excess) into the furnace in the presence of the partly reduced oxide of iron, and toward the completion of the deoxidation of iron increasing the proportion of hydrogen so as to bring it in excess, the said steps being taken in the order named.

7. The process for manufacturing iron and steel which consists in generating carbonic oxide and hydrogen in separate generators, then passing the carbonic oxide into a metallurgical furnace containing an oxide of iron, and after heating said oxide of iron and partly reducing the same, in passing hydrogen previously mixed with carbonic oxide into the furnace in the presence of the partly reduced oxide of iron and carbonic acid under great pressure to increase the temperature the combustion of said hydrogen taking place under said pressure, and toward the completion of the deoxidation process causing the iron and steel to ball, as it comes to nature.

8. The combination of a furnace in which to reduce ores, a water gas generator provided with air and steam pipes, a valved fuel entrance for charging the water gas generator with fuel, a producer for generating carbonic oxide gas, a flue connecting the metallurgical furnace with both the water gas generator and the producer, and valves to control the gases passing from the water gas generator and producer respectively.

9. The combination of a furnace in which to reduce ores, a water gas generator provided with air and steam pipes, a valved fuel entrance for charging the water gas generator with fuel, a producer for generating carbonic oxide gas, a flue connecting the metallurgical furnace with both the water gas generator and the producer, valves to control the gases passing from the water gas generator and producer respectively, and a valved flue connecting the discharge of the producer with the water gas generator, whereby the gases of the former are caused to pass into the latter.

10. The combination of a rotary furnace, with a flue entering said furnace and kept in a heated condition by the escaping products of combustion, a generator to produce carbonic oxide gas communicating with said flue by a valved orifice, a generator to produce hydrogen gas connected with said flue by a valved orifice, whereby the hydrogen and carbonic oxide commingle in the heated flue before passing into the furnace.

11. The combination of a rotary furnace, with a flue entering said furnace and kept in a heated condition by the escaping products of combustion, a generator to produce carbonic oxide gas communicating with said flue by a valved orifice, a generator to produce hydrogen gas connecting with said flue by a valved orifice, whereby the hydrogen and carbonic oxide commingle in the heated flue before passing into the furnace, and a resistance or weighted valve device to keep the gases in the furnace under considerable pressure to increase the temperature by burning the hydrogen under pressure.

12. The combination of a rotary furnace, with a flue entering said furnace and kept in a heated condition by the escaping products of combustion, a generator to produce carbonic oxide gas communicating with said flue by a valved orifice, a generator to produce hydrogen connected with said flue by a valved orifice, whereby the hydrogen and carbonic oxide commingle in the heated flue before passing into the furnace, and means extending to the outside of the furnace to enable the operator to regulate at will the valves controlling the admission of the different gases and at the same time watch the progress of the reduction of the oxide of iron within the furnace.

13. The combination of a vessel to be heated, an outlet from said vessel provided with means to create a back pressure, a water gas generator communicating with the vessel by means of a flue and provided with a steam pipe whereby the water gas generated under pressure may be forced to the vessel to be heated and allowed to escape under a back pressure.

In testimony of which invention I hereunto set my hand.

RUDOLPH M. HUNTER.

Witnesses:
R. S. CHILD, Jr.,
GEORGE E. BUCKLEY.